C. ZIEGLER.
TIRE WRAPPING AND UNWRAPPING APPARATUS.
APPLICATION FILED MAY 26, 1919.
1,336,328. Patented Apr. 6, 1920.
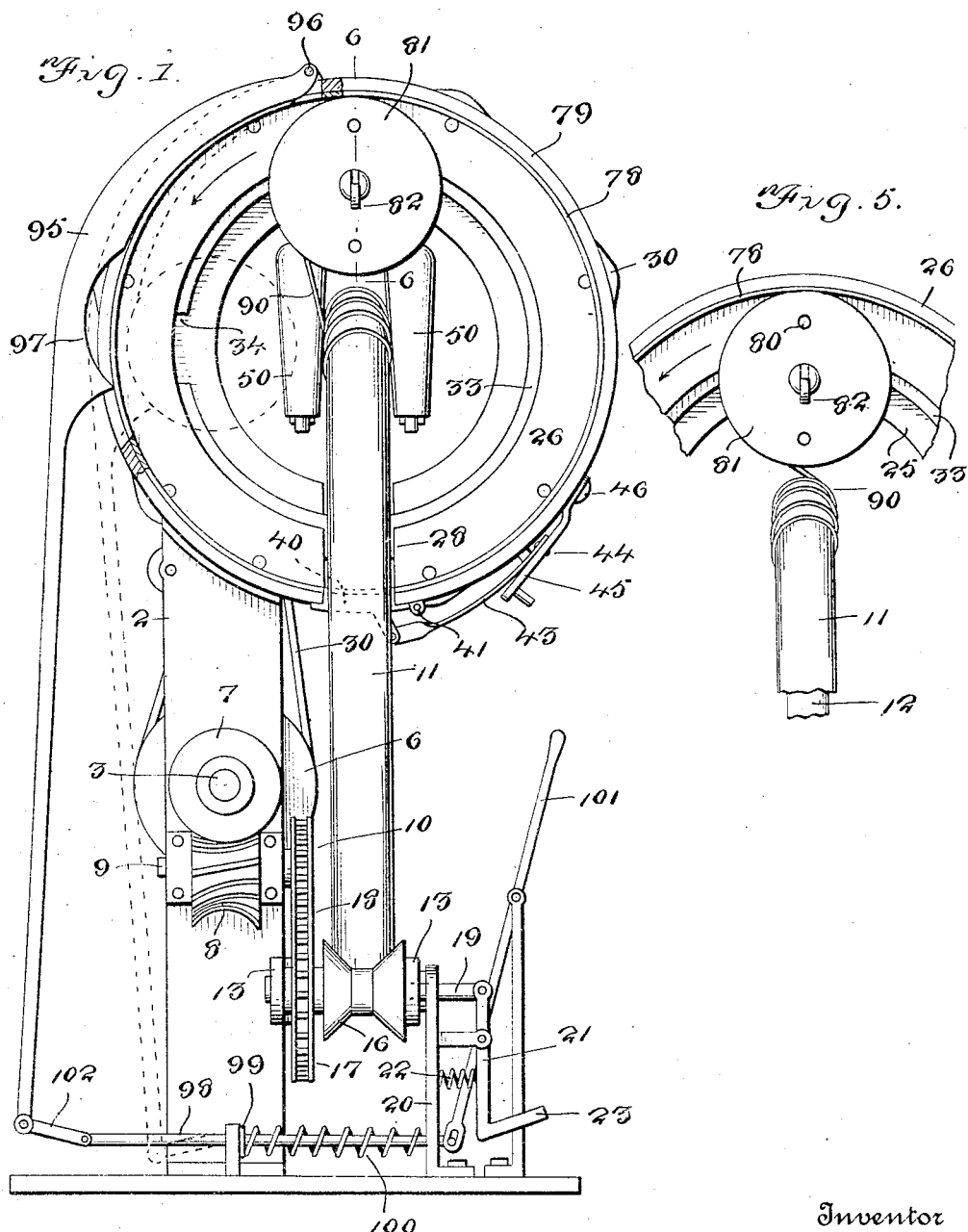

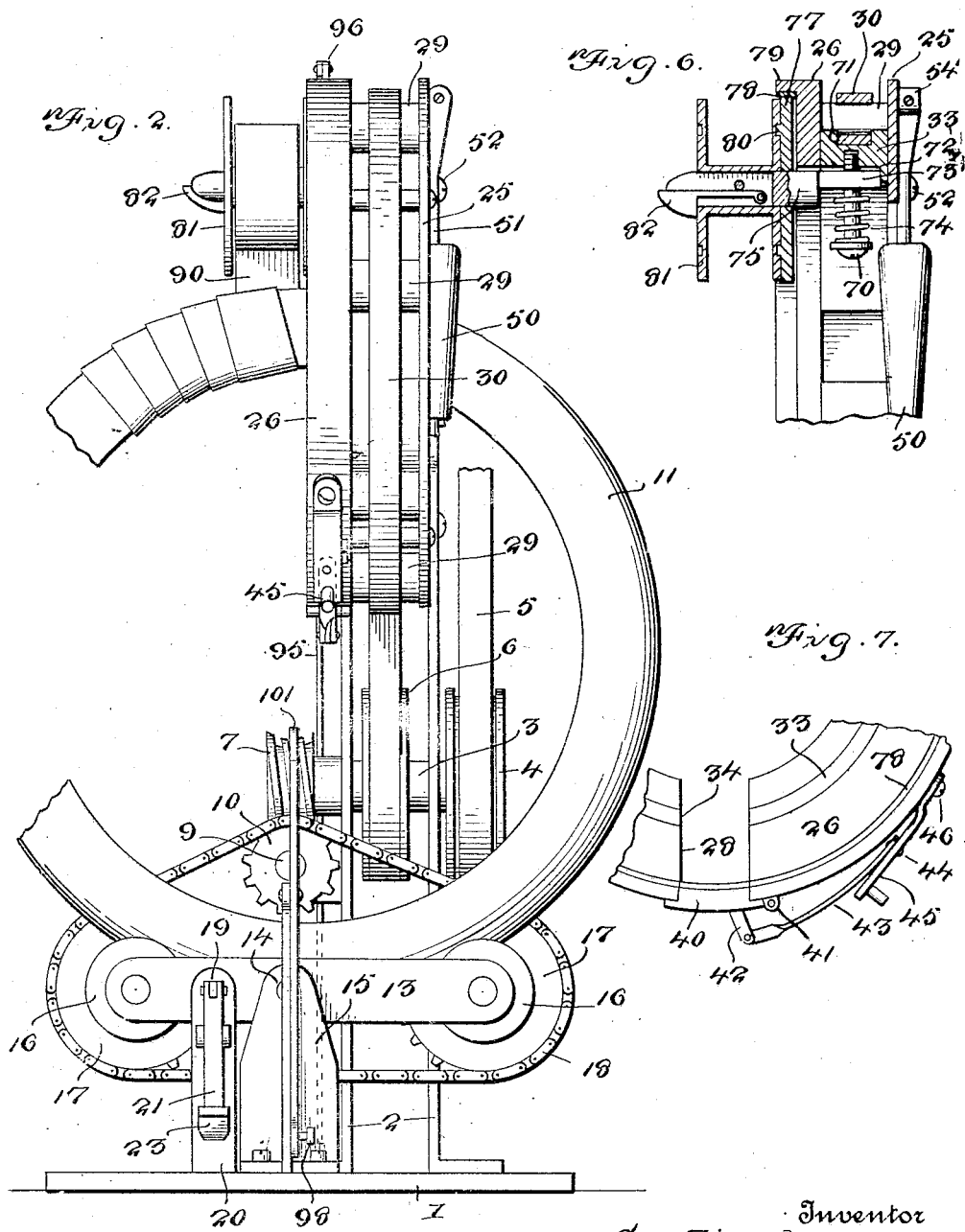

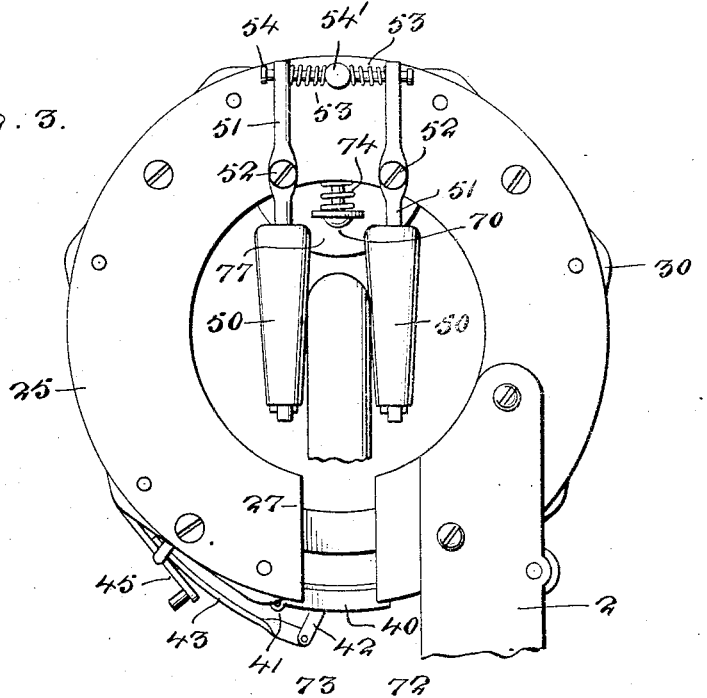
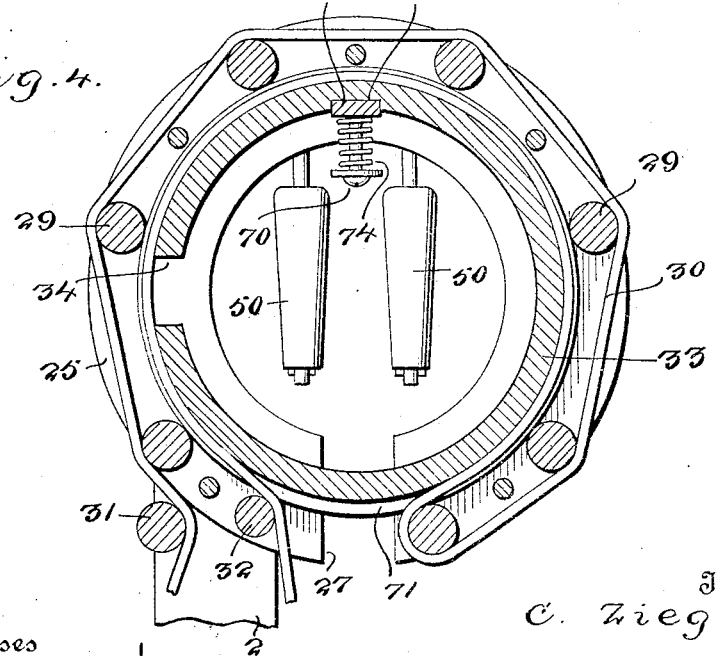

UNITED STATES PATENT OFFICE.

CRAWFORD ZIEGLER, OF BARBERTON, OHIO.

TIRE WRAPPING AND UNWRAPPING APPARATUS.

1,336,328.   Specification of Letters Patent.   Patented Apr. 6, 1920.

Application filed May 26, 1919. Serial No. 299,696.

*To all whom it may concern:*

Be it known that I, CRAWFORD ZIEGLER, a citizen of the United States, residing at Barberton, in the county of Summit and State of Ohio, have invented new and useful Improvements in Tire Wrapping and Unwrapping Apparatus, of which the following is a specification.

One of the objects of my present invention is the provision of an efficient organized mechanism for taking the tape wrappings off rubber tire casings as the casings come from the curing boiler, thereby obviating the necessity of removing such tapes by hand and the attendant rolling of the tapes into balls and the subsequent requisite of unrolling the tapes and winding the same upon spools, by hand, before the tapes are applied by machinery to other tire casings to be cured.

Another object of the invention is the provision of an organized mechanism that is efficient both in applying tapes to and removing the same from tire casings.

Other objects and practical advantages of the invention will be fully understood from the following description and claims, when the same are read in connection with the drawings, accompanying and forming part of this specification, in which:

Figure 1 is an elevation of the apparatus constituting the best practical embodiment of my invention of which I am cognizant.

Fig. 2 is a broken elevation taken at right angles to Fig. 1.

Fig. 3 is a detail elevation of a portion of the side of the apparatus opposite to that shown in Fig. 1.

Fig. 4 is a detail vertical section taken in a plane parallel to Figs. 1 and 3.

Fig. 5 is a detail elevation illustrative of the taking of a tape off a tire casing.

Figs. 6 and 7 are fragmentary details hereinafter explicitly referred to; Fig. 6 being a section taken in the plane indicated by the line 6—6 of Fig. 1.

Similar numerals of reference designate corresponding parts in all of the views of the drawings.

Among other elements the illustrated apparatus embodying my invention comprises a base 1 and parallel standards 2 fixed upon said base. Journaled in the standards 2 is a shaft 3 on which is a pulley 4, designed to be connected through a band 5 with a motor (not shown). The said shaft 3 also carries a band pulley 6 that is disposed between the standards 2, and a worm 7; said worm 7 being intermeshed with a worm gear 8 that is fixed upon a shaft 9, carried by one of the standards 2 in a position at right angles to the shaft 3. Fixed on the said shaft 9 is a sprocket gear 10. The band pulley 4 may be clutched to the shaft 3 or any other provision may be made for enabling the operator of the apparatus to quickly disconnect the working parts of the apparatus from the power means.

In conjunction with the standards 2 and the sprocket gear 10, I provide a cradle for supporting the tire casings to be wrapped or unwrapped, one of the said casings being indicated by 11 and being arranged upon one of the circular cores 12 that are well known in the art. The cradle referred to comprises body bars 13, fulcrumed at 14 between one of the standards 2 and an auxiliary standard 15, circumferentially grooved rolls 16 interposed between the end portions of the said body bars 13 and designed to support, feed and hold the casing 11 in proper position and against lateral deflection incidental to the putting on or taking off of a protective tape, and sprocket gears 17 fixed with respect to the said rolls 16. Trained upon the sprocket gears 10 and 16 is a sprocket belt 18, and consequently rotation of the shafts 3 and 9 will be attended by rotation of the rolls 16 and feed of the core-containing casing 11.

The cradle described is capable of rocking upon the center of movement 14, in order to facilitate the putting of a casing 11 on a core 12, into and removing the same from the apparatus. The said cradle is detachably secured in the working position shown in Fig. 2 through the medium of a latch-bolt 19, Fig. 1, that is passed through an aperture in a standard 20 and is designed to enter an aperture in the adjacent cradle bar 13. At its outer end the said latch bolt 19 is connected to the upper arm of a lever 21 that is subject to the action of a spring 22 and is provided on its lower arm with a pedal 23. When the pedal 23 is pressed upon to withdraw the latch bolt 19 from engagement with the cradle, the cradle will be canted toward the right in Fig. 2, so as to facilitate the removal of the core-containing casing 11 from the apparatus. The said canting of the cradle and the core will take place because of the portion of the cradle at the right-hand side of the center of movement 14 in Fig. 2 being comparatively long and heavy. When a core-containing casing 11 is to be put into the apparatus, the said operation is accomplished while the cradle is canted toward the left in Fig. 2. The cradle with the core-containing casing thereon is then swung to the position shown in Fig. 2, in which position it will be automatically secured by the entry of the latch bolt 19 in the mentioned aperture in the adjacent bar 13 of the cradle.

Fixed to the upper portions of the standards 2 and spaced apart, are upright parallel annular frame members 25 and 26. The said members 25 and 26 having between their lower ends openings 27, Fig. 3, and 28, Fig. 7, respectively. Mounted between the frame members 25 and 26 are transverse rolls 29, Fig. 4, and looped around these rolls 29, after the manner shown in Fig. 4, is a belt 30 that is also looped about the pulley 6 and has its stretches guided on idler rolls 31 and 32 that are also best shown in Fig. 4. By reference to Fig. 4 it will be observed that a revoluble annulus 33 is disposed between the frame members 25 and 26 and is arranged within and in frictional engagement with the inner stretch of the belt 30. From this it follows that when the belt 30 is driven through the medium of the pulley 6, the annulus 33 will be rotated about its center to effect the removal of a tape from or the application of a tape to a tire casing 11, as the case may be. Between the ends of the annulus 33 is an opening 34, designed to be made coincident with the before-mentioned openings 27 and 28, for the putting in or the taking out of a tire casing 11. At 40 is a gate for closing the opening 28 in the member 26 during the putting on or taking off of a tape, with a view to affording a continuous bearing for the spool-driving disk, hereinafter described. The said gate 40, Figs. 3 and 7, is hinged at 41 and is provided with an arm 42. To this arm 42 is pivoted one end of a link 43, the other end of which is pivoted at 44 to the inner side of a hand lever 45 which, in turn, is pivoted at 46 to the perimeter of the member 26. With the parts just described, arranged in a practical dead center, as shown in Fig. 7, the gate 40 will manifestly be securely retained in closed position. When, however, the lever 45 is swung on its center 46 so as to extend laterally from the frame member 26, the link 43 will pull the gate 40 to open position. Consequently when the lever 45 is swung back into the vertical plane of the member 26, the link 33 will thrust the gate 40 into closed position.

At 50 are rolls designed to hold the core-containing tire casing 11 against lateral deflection without interfering with the circular feed of the said casing. Said rolls 50 are mounted upon the lower arms of levers 51 which are fulcrumed at 52 on the frame member 25, Fig. 3, and have their upper arms subject to springs 53 which are mounted loosely on a rod 54 and are interposed between the upper arms of the levers 51 and a fixed abutment 54' on the said member 25. The upper arms of the levers 51 are yieldingly pressed outwardly by the springs 53, with the result that the rolls 50 are held under yielding pressure against the opposite sides of the casing 11, for the purpose stated.

By particular reference to Fig. 6 it will be observed that a headed bolt 70 is threaded into the annulus 33 and extends inwardly from said annulus. It will also be observed that the annulus 33 is circumferentially grooved at 71 to receive the inner stretch of the belt 30 so as to preclude any lateral deflection of the stretch. By comparison of Figs. 4 and 6, it will be noted that the annulus 33 is provided in its inner side with a transverse groove 72. In said groove 72 is seated a bar 73 that loosely receives the bolt 70 and is yieldingly maintained in its seat 72 by a coiled spring 74 mounted on the bolt 70 and interposed between the head thereof and the bar 73. Said bar 73 is disposed at right angles to the annulus 33, and is equipped with a journal 75 on which is mounted to rotate a disk 77 that is perpendicularly opposed to a friction-creating lining 78 in the inner side of the flange 79 on the frame member 26. It will be readily understood, however, that the spring 74 serves at all times to yieldingly press the disk 77 against the lining 78 so that turning of the annulus 33 will be attended by rotation of the said disk 77 about its axis during the movement of the said disk 77 as a whole through the circle within the flange 79. Removably mounted on the journal 75 and keyed, as indicated by 80, to the disk 77, is a spool 81 which is detachably secured upon the journal 75 and in keyed relation to the disk 77 by a latch 82 possessed of resiliency which is carried in a bifurcation of the journal 75 and is provided with a beveled head, as illustrated. Manifestly after manipulation of the latch 82, the spool 81 may be withdrawn from the journal 75 and out of engagement with the disk 77, and when it is desired to put a spool 81 on the journal 75, the same may be readily accomplished by crowding the spool past the beveled head of the latch and on the journal 75 and into keyed engagement with the disk 77.

In Figs. 1 and 2 the machine is shown to operate in the taking of a tape, indicated by 90, off a core-containing casing 11, and in Fig. 5 the tape 90 is shown as arranged for the putting of the same upon the core-containing casing 11. In the first instance wrapped casing is placed in my novel apparatus, and the apparatus is operated, whereupon the tape, one end of which is attached to the spool 81, will be taken off the casing and upon the spool. In the second instance the end of the tape is secured initially to the casing, and the casing is wrapped throughout until the other end of the tape leaves the spool, whereupon such end is suitably secured and the wrapped tire casing is then ready to be removed from my apparatus and put in a curing boiler.

It will be readily apparent that incidental to the first-named operation the circular movements of the spool 81 about the core-containing casing 11 coincident with the circular feed of the said casing will be attended by the removal of the tape, convolution after convolution, from the casing. In the second-named operation the revolutions of the spool 81 about the core-containing casing will be attended by the putting of the tape, convolution after convolution, upon the casing.

It will further be apparent that in the use of my apparatus the opening 34 in the annulus 33 will be made coincident with the openings 27 and 28 in the frame members 25 and 26, respectively, precedent to the putting of the core-containing casing in the apparatus, and also precedent to the removal of the core-containing casing from the apparatus.

In order to enable the operator to stop the spool 81 at the completion of either a tape putting on or tape taking off operation, I provide the means clearly shown in Fig. 1. The said means comprises a lever 95, hinged at 96 to the frame member 26, and having a recess 97 in its inner edge, a rod 98 mounted in guides and equipped with an abutment 99, a spring 100 interposed between said abutment 99 and the standard 20, a hand lever 101 having its lower arm connected to one end of said rod 98, and a link 102 interposed between the other end of the said rod 98 and the lower end of the lever 95.

From the foregoing it will be readily understood that when the putting on or the taking off of a tape is approaching completion, the operator has only to interrupt connection between the shaft 3 and the power means, and then actuate the lever 101, whereupon the momentum of the moving parts will carry the spool into the recess 97 of lever 95, with the result that the spool will be stopped in a position convenient for the removal of the said spool and for the subsequent placing of another spool upon the journal 75.

Having described my invention, what I claim and desire to secure by Letters-Patent, is:

1. An organized mechanism comprising means for circularly feeding an annular body, a spool, a primary driver for actuating the circularly feeding means, means actuatable by the primary driver for revolving the spool about the transverse section of the annular body, and friction means for rotating the spool about its axis coincident with said revolution of the spool, in combination with manually-controlled movable means extraneous of the actuating means to seat and stop the spool.

2. An organized mechanism for either of the purposes described, comprising a rocking cradle mounted to gravitate in one direction and including rolls, means for latching said cradle against gravitation, a primary driver, and a connection between said primary driver and the rolls of the cradle.

3. An organized tire wrapping and unwrapping mechanism comprising the combination with means for revolving about the transverse section of an annular body, means for revolving said revoluble means, revoluble tape means carried by said revoluble means, and means for rotating the tape means about its axis incidental to revolution of the revoluble means, of a rocking cradle, a latch therefor, rolls in the cradle, and means for rotating said rolls.

4. In a tire wrapping and unwrapping machine, the combination of a rocking cradle having rolls adjacent to its ends, and manual means for latching the cradle.

5. In a tire wrapping and unwrapping machine, the combination of a rocking cradle having rolls adjacent to its ends, and manual means for latching the cradle; one arm of the said rocking cradle being comparatively long in order that when an annular body is superimposed on the rolls and the cradle is unlatched such arm will gravitate with the load thereon.

6. An organized mechanism comprising means for circularly feeding an annular body, means revoluble about the transverse section of said body, a spool carried by said revoluble means, a friction driver for turning the spool about its axis during the revolution of the revoluble means, and manually-controlled movable means extraneous of the actuating means to seat and stop the spool.

7. The combination of supporting means, a revoluble annulus therein, a spool carried by the annulus, annular friction-creating means for turning the spool about its axis, a lever fulcrumed at its upper end on the supporting means and having a recess adapted to be positioned to receive and thereby stop the spool, and manual means through which said lever may be manipulated.

8. The combination of an annular friction-creating member, a revoluble annulus, a bifurcated journal connected to the annulus, means for revolving the annulus, a disk loose on the journal and opposed to the friction-creating member, a spool loose on the journal and keyed to the disk, and a latch mounted in the bifurcation of the journal and adapted to retain the spool in engagement with the disk.

In testimony whereof I affix my signature.

CRAWFORD ZIEGLER.